United States Patent
Li et al.

(10) Patent No.: US 10,621,415 B2
(45) Date of Patent: Apr. 14, 2020

(54) FACIAL IMAGE PROCESSING APPARATUS, FACIAL IMAGE PROCESSING METHOD, AND NON-TRANSITORY COMPUTER-READABLE STORAGE MEDIUM

(71) Applicant: BOE TECHNOLOGY GROUP CO., LTD., Beijing (CN)

(72) Inventors: Zhenglong Li, Beijing (CN); Lijie Zhang, Beijing (CN); Jingyu Zhang, Beijing (CN)

(73) Assignee: BOE TECHNOLOGY GROUP CO., LTD., Beijing (CN)

( * ) Notice: Subject to any disclaimer, the term of this patent is extended or adjusted under 35 U.S.C. 154(b) by 156 days.

(21) Appl. No.: 15/565,754

(22) PCT Filed: Apr. 24, 2017

(86) PCT No.: PCT/CN2017/081618
§ 371 (c)(1),
(2) Date: Oct. 11, 2017

(87) PCT Pub. No.: WO2017/198040
PCT Pub. Date: Nov. 23, 2017

(65) Prior Publication Data
US 2018/0204051 A1    Jul. 19, 2018

(30) Foreign Application Priority Data
May 19, 2016    (CN) .......................... 2016 1 0339674

(51) Int. Cl.
*G06K 9/00*    (2006.01)
*G06T 5/00*    (2006.01)
(Continued)

(52) U.S. Cl.
CPC ....... *G06K 9/00268* (2013.01); *G06K 9/4628* (2013.01); *G06K 9/6274* (2013.01);
(Continued)

(58) Field of Classification Search
CPC . G06T 2207/20084; G06T 2207/20081; G06T 2207/30201; G06T 3/4046;
(Continued)

(56) References Cited

U.S. PATENT DOCUMENTS 8,805,120 B2 *  8/2014  Min ...................... G06T 3/4046
                                                    382/224
2004/0170337 A1  9/2004  Simon et al.
(Continued)

FOREIGN PATENT DOCUMENTS

CN         1525401 A      9/2004
CN       101261677 A      9/2008
(Continued)

OTHER PUBLICATIONS

First Office Action in the Chinese Patent Application No. 201610339674.3, dated Apr. 4, 2018; English translation attached.
(Continued)

*Primary Examiner* — Kenny A Cese
(74) *Attorney, Agent, or Firm* — Intellectual Valley Law, P.C.

(57) ABSTRACT

The present application discloses a facial image processing apparatus. The facial image processing apparatus includes a memory; and one or more processor. The memory and the at least one processor are communicatively connected with each other. The memory stores computer-executable instructions for controlling the one or more processors to automatically identify a facial feature from a facial image; automatically extract an image portion defining the facial feature from the facial image; perform a detail enhancement process
(Continued)

on the image portion to obtain a detail-enhanced image portion corresponding to the image portion; and perform an image composition process to compose the detail-enhanced image portion and the facial image to obtain an enhanced facial image.

16 Claims, 7 Drawing Sheets

(51) Int. Cl.
*G06K 9/46* (2006.01)
*G06T 7/11* (2017.01)
*G06K 9/62* (2006.01)

(52) U.S. Cl.
CPC .............. *G06T 5/001* (2013.01); *G06T 5/003* (2013.01); *G06T 7/11* (2017.01); *G06T 2207/20084* (2013.01); *G06T 2207/30201* (2013.01)

(58) Field of Classification Search
CPC . G06T 5/002; G06T 5/003; G06T 7/11; G06T 5/001; G06K 9/00268; G06K 9/00281; G06K 9/00288; G06K 9/00302; G06K 9/4628
See application file for complete search history.

(56) References Cited

U.S. PATENT DOCUMENTS

| | | | |
|---|---|---|---|
| 2014/0176548 A1 | 6/2014 | Green | |
| 2015/0178554 A1* | 6/2015 | Kanaujia | G06T 19/20 382/118 |
| 2015/0363634 A1* | 12/2015 | Yin | G06K 9/00221 382/118 |
| 2016/0239944 A1* | 8/2016 | Bedi | G06K 9/6201 |
| 2017/0193680 A1* | 7/2017 | Zhang | G01N 21/9501 |
| 2017/0256033 A1* | 9/2017 | Tuzel | G06T 5/00 |
| 2017/0262695 A1* | 9/2017 | Ahmed | G06K 9/00288 |
| 2017/0304732 A1* | 10/2017 | Velic | G06K 9/00201 |

FOREIGN PATENT DOCUMENTS

| | | |
|---|---|---|
| CN | 101527786 A | 9/2009 |
| CN | 101639937 A | 2/2010 |
| CN | 102902966 A | 1/2013 |
| CN | 104778659 A | 7/2015 |
| CN | 105096279 A | 11/2015 |

OTHER PUBLICATIONS

International Search Report & Written Opinion dated Jul. 20, 2017, regarding PCT/CN2017/081618.

* cited by examiner

FACIAL IMAGE PROCESSING APPARATUS, FACIAL IMAGE PROCESSING METHOD, AND NON-TRANSITORY COMPUTER-READABLE STORAGE MEDIUM

CROSS-REFERENCE TO RELATED APPLICATION

This application is a national stage application under 35 U.S.C. § 371 of International Application No. PCT/CN2017/081618, filed Apr. 24, 2017, which claims priority to Chinese Patent Application No. 201610339674.3, filed May 19, 2016, the contents of which are incorporated by reference in the entirety.

TECHNICAL FIELD

The present invention relates to image processing technology, more particularly, to a facial image processing apparatus, a facial image processing method, and a non-transitory computer-readable storage medium.

BACKGROUND

A deep neural network is an artificial neural network with multiple hidden layers of units between an input layer and an output layer. Artificial neural networks such as the deep neural network are brain-inspired networks used in machine learning applications. In a typical deep neural network, neurons are arranged in layers and each neuron in the network is connected to other neurons through adaptive weights. For example, the typical deep neural network may include an input layer which is a set of features connected, by weights to the neurons in the first layer of the hidden layers, an output layer which gives classification, and a number of hidden layers between the input layer and the output layer.

SUMMARY

In one aspect, the present invention provides a facial image processing apparatus, comprising a memory; and one or more processor; wherein the memory and the at least one processor are communicatively connected with each other; the memory stores computer-executable instructions for controlling the one or more processors to automatically identify a facial feature from a facial image; automatically extract an image portion defining the facial feature from the facial image; perform a detail enhancement process on the image portion to obtain a detail-enhanced image portion corresponding to the image portion; and perform an image composition process to compose the detail-enhanced image portion and the facial image to obtain an enhanced facial image.

Optimally, the detail enhancement process is performed using a deep convolutional neural network trained on facial image training data; and perform the image composition process comprises replace the image portion in the facial image with the detail-enhanced image portion and integrate the detailed-enhanced image with the facial image to obtain the enhanced facial image.

Optionally, automatically extract the image portion defining the facial feature from the facial image comprises process the facial image using a convolutional neural network to determine an image region in the facial image containing the facial feature; segment the image region in the facial image to determine an image segment in the image region containing the facial feature, thereby obtaining an image segment corresponding to the facial feature; and label a plurality of pixels in the image segment thereby extracting the image portion.

Optionally, perform the detail enhancement process on the image portion to obtain the detail-enhanced image portion corresponding to the image portion comprises provide a deep neural network, the deep neural network being trained using facial image training data; input an input signal comprising the image portion or derived from the image portion into an input layer of the deep neural network; process the input signal through one or more hidden layers of the deep neural network to obtain a processed signal; and output the processed signal from an output layer of the deep neural network as the detail-enhanced portion.

Optionally, the deep neural network is trained using, a plurality of pairs of high-resolution image portion and low-resolution image portion; wherein the plurality of pairs of high-resolution image portion, and low-resolution image portion are generated by providing a plurality of high-resolution reference image portions; and generating a plurality of low-resolution reference image portions respectively corresponding to the plurality of high-resolution reference image portions.

Optionally, generating a plurality of low-resolution reference image portions comprises generating a noise-perturbed version of a low-resolution reference image portion corresponding to one of the plurality of high-resolution reference image portions; generating a noise-perturbed version of the low-resolution reference image portion comprises perturbing the low-resolution reference image portion with a noise to obtain a noise-perturbed version of the low-resolution reference image portion.

Optionally, process the input signal through the one or more hidden layers of the deep neural network to obtain the processed signal comprises process the input signal using a loss function.

Optionally, perform the image composition process to compose the detail-enhanced image portion and the facial image to obtain the enhanced facial image comprises replace a portion of the facial image corresponding to the image portion, with the detail-enhanced image portion to obtain an integrated facial image comprising the detail-enhanced image portion and a portion outside the detail-enhanced image portion integrated together; and smoothing filter a transitional region comprising an interface between the detail-enhanced image portion and the portion outside the detail-enhanced image portion using the facial image as a guiding mask, thereby obtaining the enhanced facial image.

Optionally, the facial image processing apparatus further comprises an image capturing device configured to capture the facial image, the image capturing device being communicatively connected with the processor.

Optionally, the facial image comprises a plurality of facial features; the memory stores computer-executable instructions for controlling the one or more processors to automatically identify a plurality of facial features from a facial image; automatically extract a plurality of image portions respectively defining the plurality of facial features from the facial image; perform a detail enhancement process on the plurality of image portions to obtain a plurality of detail-enhanced image portions respectively corresponding to the plurality of image portions; and perform an image composition process to compose the plurality of detail-enhanced image portions and the facial image to obtain the enhanced facial image.

In another aspect, the present invention provides a facial image processing method, comprising automatically identifying a facial feature from a facial image; automatically extracting an image portion defining the facial feature from the facial image; performing a detail enhancement process on the image portion to obtain a detail-enhanced image portion corresponding to the image portion; and performing an image composition process to compose the detail-enhanced image portion and the facial image to obtain an enhanced facial image.

Optionally, performing the detail enhancement process comprises performing the detail enhancement process using a deep convolutional neural network trained on facial image training data; and performing the image composition process comprises replacing the image portion in the facial image with the detail-enhanced image portion and integrating the detailed-enhanced image with the facial image to obtain the enhanced facial image.

Optionally, automatically extracting the image portion comprises processing the facial image using a convolutional neural network to determine an image region in the facial image containing the facial feature; segmenting the image region in the facial image to determine an image segment in the image region and containing the facial feature, thereby obtaining an image segment corresponding to the facial feature; and labeling a plurality of pixels in the image segment thereby extracting the image portion.

Optionally, performing the detail enhancement process on the image portion comprises providing a deep neural network, the deep neural network being trained using facial image training data; inputting an input signal comprising the image portion or derived from the image portion into an input layer of the deep neural network; processing the input signal through one or more hidden layers of the deep neural network to obtain a processed signal; and outputting the processed signal from an output layer of the deep neural network as the detail-enhanced image portion.

Optionally, the facial image processing method further comprises training the deep neural network using facial image training data; wherein training the deep neural network comprises providing a plurality of high-resolution reference image portions; generating a plurality of low-resolution reference image portions respectively corresponding to the plurality of high-resolution reference image portions, thereby obtaining a plurality of pairs of high-resolution image portion and low-resolution image portion; and naming the deep neural network using the plurality of pairs of high-resolution image portion and low-resolution image portion.

Optionally, generating a plurality of low-resolution reference image portions comprises generating a noise-perturbed version of a low-resolution reference image portion corresponding to one of the plurality of high-resolution reference image portions: generating a noise-perturbed version of the low-resolution reference image portion comprises perturbing the low-resolution reference image portion with a noise to obtain a noise-perturbed version of the low-resolution reference image portion.

Optionally, processing the input signal through the one or more hidden layers of the deep neural network comprises processing the input signal using a loss function.

Optionally, performing the image composition process to compose the detail-enhanced image portion and the facial image to obtain the enhanced facial image comprises replacing a portion of the facial image corresponding to the image portion with the detail-enhanced image portion to obtain an integrated facial image comprising the detail-enhanced image portion and a portion outside the detail-enhanced image portion integrated together, and smoothing filtering a transitional region comprising an interface between the detail-enhanced image portion and the portion outside the detail-enhanced image portion using the facial image as a guiding mask, thereby obtaining the enhanced facial image.

In another aspect, the present invention provides a non-transitory computer-readable storage medium storing computes-readable instructions, the computer-readable instructions being executable by a processor to cause the processor to perform automatically identifying a facial feature from a facial image; automatically extracting an image portion defining the facial feature from the facial image; performing a detail enhancement process on the image portion to obtain a detail-enhanced image portion corresponding to the image portion; and performing an image composition process to compose the detail-enhanced image portion and the facial image to obtain an enhanced facial image.

Optionally, the detail enhancement process is performed using a deep convolutional neural network trained on facial image training data; and perform the image composition process comprises replace the image portion in the facial image with the detail-enhanced image portion and integrate the detailed-enhanced image with the facial image to obtain the enhanced facial image.

Optionally, automatically extracting the image portion comprises processing the facial image using a convolutional neural network to determine an image region in the facial image containing the facial feature; segmenting the image region in the facial image to determine an image segment in the image region and containing the facial feature, thereby obtaining an image segment corresponding to the facial feature; and labeling a plurality of pixels in the image segment thereby extracting the image portion.

Optionally, performing the detail enhancement process on the image portion comprises providing a deep neural network, the deep neural network being trained using facial image training data; inputting an input signal comprising the image portion or derived from the image portion into an input layer of the deep neural network; processing the input signal through one or more hidden layers of the deep neural network to obtain a processed signal; and outputting the processed signal from an output layer of the deep neural network as the detail-enhanced image portion.

Optionally, the deep neural network is trained using a plurality of pairs of high-resolution image portion and low-resolution image portion; wherein the plurality of pairs of high-resolution image portion and low-resolution image portion are generated by providing a plurality of high-resolution reference image portions; and generating a plurality of low-resolution reference image portions respectively corresponding to the plurality of high-resolution reference image portions.

Optionally, generating a plurality of low-resolution reference image portions comprises generating, a noise-perturbed version, of a low-resolution reference image portion corresponding to one of the plurality of high-resolution reference image portions; generating a noise-perturbed version of the low-resolution reference image portion comprises perturbing the low-resolution reference image portion with a noise to obtain a noise-perturbed version of the low-resolution reference image portion.

Optionally, processing the input signal through the one or more hidden layers of the deep neural network comprises processing the input signal using a loss function.

Optionally, performing the image composition process to compose the detail-enhanced image portion and the facial image to obtain the enhanced facial image comprises replacing a portion of the facial image corresponding to the image portion with the detail-enhanced image portion to obtain an integrated facial image comprising the detail-enhanced image portion and a portion outside the detail-enhanced image portion integrated together; and smoothing filtering a transitional region comprising an interface between the detail-enhanced image portion and the portion outside the detail-enhanced image portion using the facial image as a guiding mask, thereby obtaining the enhanced facial image.

BRIEF DESCRIPTION OF THE FIGURES

The following drawings are merely examples for illustrating purposes according to various disclosed embodiments and are not intended to limit the scope of the present invention.

DETAILED DESCRIPTION

Figure 1:
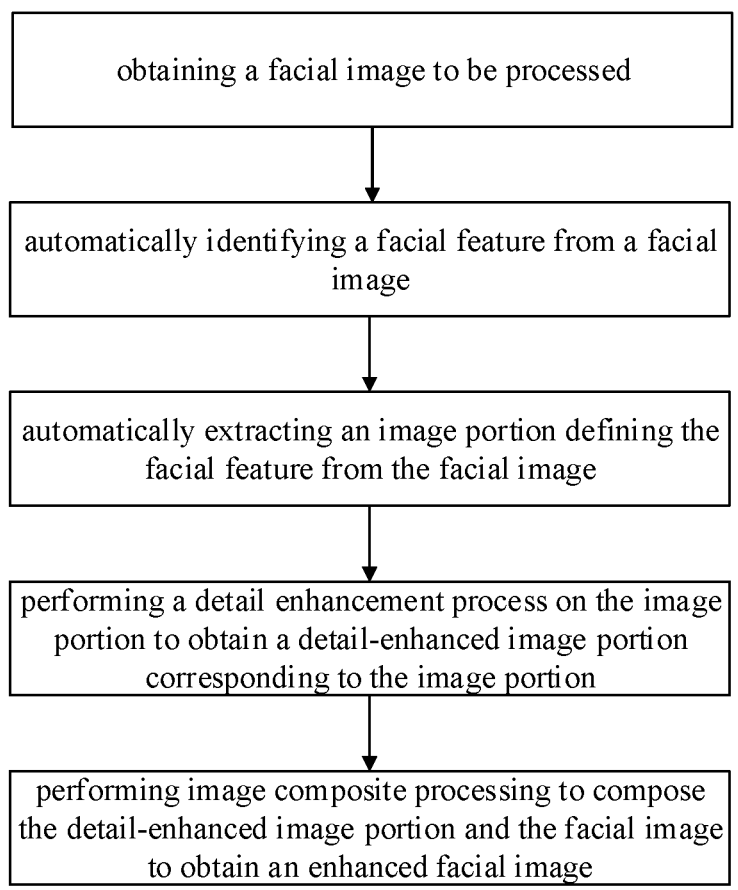
FIG. 1 is a flow chart illustrating a facial image processing method in some embodiments according to the present disclosure.

The disclosure will now be described more specifically with reference to the following embodiments. It is to be noted that the following descriptions of some embodiments are presented herein for purpose of illustration and description only. It is not intended to be exhaustive or to be limited to the precise form disclosed.

Various algorithms such as bi-linear interpolation algorithm, bi-cubic interpolation algorithm, Lanczos algorithm, super-resolution algorithm, have been used in conventional image processing methods as attempts to process low-resolution images. These algorithms are limited to certain application settings, and do not work well on images having strong structural features such as a facial image. Due to these limitations, the conventional image processing methods do not perform well on enhancing image qualities of low-resolution facial images.

Accordingly, the present invention provides, inter alia, a facial image processing apparatus, a facial image processing method, and a non-transitory computer-readable storage medium that substantially obviate one or more of the problems due to limitations and disadvantages of the related art. In one aspect, the present disclosure provides a facial image processing apparatus. In some embodiments, the facial image processing apparatus includes a memory and one or more processor, the memory and the at least one processor are communicatively connected with each other. Optionally, the memory stores computer-executable instructions for controlling for one or more processors to automatically identify a facial feature from a facial image; automatically extract an image portion defining the facial feature from the facial image; perform a detail enhancement process on the image portion to obtain a detail-enhanced image portion corresponding to the image portion; and perform image composite processing to compose the detail-enhanced image portion and the facial image to obtain an enhanced facial image. Optionally, the detail enhancement process is performed using a deep convolutional neural network trained on a large amount of facial image training data. Using the trained deep neural network, a facial image input is processed to obtain a detail-enhanced image portion corresponding a facial feature. Optionally, the image composition process is performed by replacing the image portion in the facial image with the detail-enhanced image portion; and integrating the detailed-enhanced image with the facial image to obtain the enhanced facial image. The enhanced facial image contains image portions corresponding to facial features with significantly enhanced details. Thus, the enhanced facial image has a much higher resolution as compared to an unprocessed facial image.

The present facial image processing apparatus and methods can be used to significantly enhance image qualities and resolution of various low-resolution images captured in various application settings, for example, facial images of a suspect captured in a surveillance video, a remote user's facial image in a mobile terminal application, a facial image of an actor in a movie or a television show, etc.

FIG. 1 is a flow chart illustrating a facial image processing method in some embodiments according to the present disclosure. Referring to FIG. 1, the facial image processing method in some embodiments includes obtaining a facial image to be processed; automatically identifying a facial feature from a facial image; automatically extracting an image portion defining the facial feature form the facial image; performing a detail enhancement process on the image portion to obtain a detail-enhanced image portion corresponding to the image portion; and performing an image composition process to compose the detail-enhanced image portion and the facial image to obtain an enhanced facial image.

In some embodiments, one or more facial images may be captured by a camera, or a video recorder, or any appropriate image capturing device. Optionally, the one or more facial images are one or more low-resolution facial images. For example, the one or more facial images may be a facial image in an image captured by a closed-circuit television video recorder.

As used herein, the term "facial feature" refers to major features present in every human face. Optionally, the facial feature refers to primary facial features such as mouth, nose, and eyes. Optionally, the facial feature includes secondary facial features such as lips, eyebrows, teeth, eyelashes, cheeks, nostrils, pupils, ears, facial hairs such as hairs and mustache, etc. Optionally, the facial feature further includes a portion of a primary facial feature such as a middle portion of the mouth, a tip of the nose, a point on the bridge of the nose between two eyes, etc.

In some embodiments, the step of automatically identifying and extracting the image portion includes processing the facial image using a convolutional neural network (e.g., a deep convolutional neural network) to determine an image region in the facial image containing the facial feature. Optionally, the step includes processing the facial image using a convolutional neural network (e.g., a deep convolutional neural network) to determine a plurality of image regions in the facial image containing the facial feature. For example, the facial image to be processed may be used as an input for the deep convolutional neural network, an algorithm is executed to determine an upper region of the face (an elongated region in which eyes are located), a lower region of the face (a region in which the mouth is located), and a middle region (a region in which the nose is located) between the upper region and the lower region.

Once the image region is determined, the step of automatically identifying and extracting the image portion m some embodiments further includes segmenting the image region in the facial image to determine an image segment in the image region and containing the facial feature, thereby obtaining an image segment corresponding to the facial feature. Optionally, the step includes segmenting each of the plurality of the image regions in the facial image to determine a plurality of image segments, each of which in one of the plurality of image regions and containing one of the plurality of facial features, thereby obtaining the plurality of image segments corresponding to the plurality of facial features. Optionally, the step of segmenting the image region is performed using a shallow neural network. Optionally, the step of segmenting, the image region is performed using a deep neural network.

Once the image segment is determined, the step of automatically identifying and extracting the image portion in some embodiments further includes labeling a plurality of pixels (e.g., each pixel) in the image segment thereby extracting the image portion. Optionally, the step includes labeling a plurality of pixels (e.g., each pixel) in the plurality of image segments thereby extracting the plurality of image portions.

Figure 8:
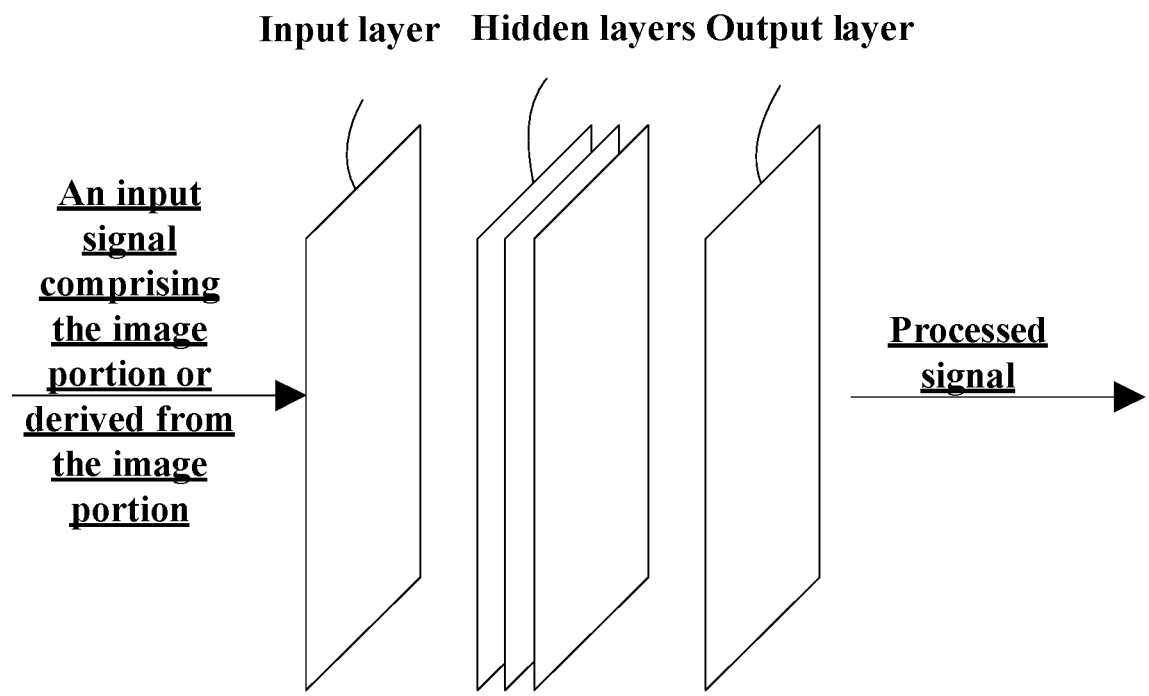
FIG. 8 illustrates a method of performing the detail enhancement process on the image portion to obtain the detail-enhanced image portion corresponding to the image portion in some embodiments according to the present disclosure.

FIG. 8 illustrates a method of performing the detail enhancement process on the image portion to obtain the detail-enhanced image portion corresponding to the image portion in some embodiments according to the present disclosure. In some embodiments, and referring to FIG. 8, the step of performing the detail enhancement process on the image portion includes providing a deep neural network that has been previously trained; inputting an input signal including the image portion or derived from the image portion as an input into an input layer of the deep neural network; processing the input signal through one or more hidden layers of the deep neural network to obtain a processed signal; and outputting the processed signal from an output layer of the deep neural network as the detail-enhanced image portion. Optionally, the deep neural network is trained with stochastic gradient descent algorithm using a large amount of facial image training data. Optionally, the deep neural network is trained with naive stochastic gradient descent algorithm. Optionally, the deep neural network is trained with momentum-based stochastic gradient descent algorithm. Optionally, the step of processing the input signal through the one or more hidden layers of the deep neural network includes processing the input signal using a loss function.

Figure 9:
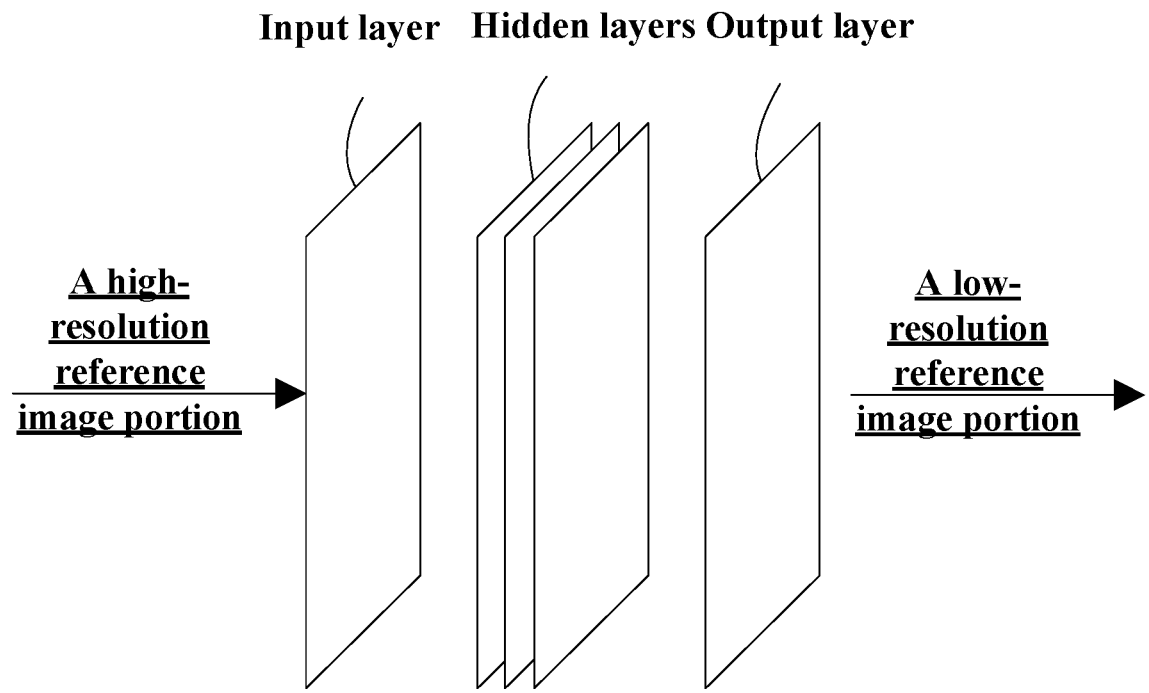
FIGS. 9-10 illustrate a method of training a deep neural network in some embodiments according to the present disclosure.
Figure 10:
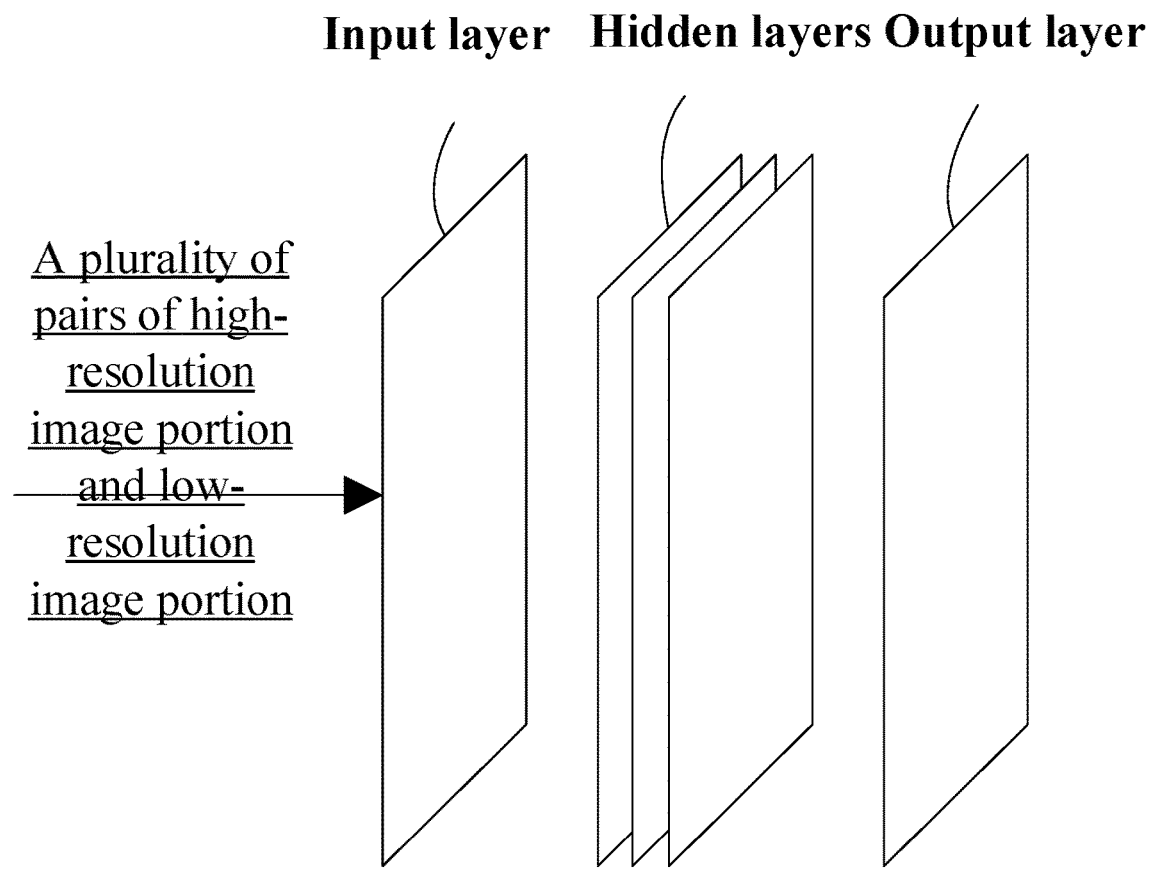

FIGS. 9-10 illustrate a method of training a deep neural network in some embodiments according to the present disclosure. In some embodiments, the method further includes training the deep neural network using facial image training data. Optionally, the facial image training data includes a large number of pairs of high-resolution image portion and low-resolution image portion. In one example, and referring to FIG. 9, the step of training the deep neural network includes providing a plurality of high-resolution reference image portions; generating a plurality of low-resolution reference image portions respectively corresponding to the plurality of high-resolution reference image portions, thereby obtaining a plurality of pairs of high-resolution image portion and low-resolution image portion; and referring to FIG. 10, the method further includes training the deep neural network using the plurality of pairs of high-resolution image portion and low-resolution image portion. Optionally, the plurality of high-resolution reference image portions may be collected from a database of high-resolution reference images. In one example, the database of high-resolution reference images contains high-resolution facial images. The plurality of high-resolution reference image portions, e.g., high-resolution reference eye image segments, high-resolution reference nose image segments, high-resolution reference mouth image segments may be obtained from the high-resolution facial images. Using the plurality of high-resolution reference image portions, the plurality of low-resolution reference image portions respectively corresponding to the plurality of high-resolution reference image portions may be, e.g., artificially generated for training purpose. Optionally, the low-resolution reference image portion may be a noise-perturbed version of a low-resolution reference image portion. Optionally, generating a plurality of low-resolution reference image portions includes generating a noise-perturbed version of a low-resolution reference image portion corresponding to one of the plurality of high-resolution reference image portions. Optionally, generating a noise-perturbed version of the low-resolution reference image portion includes perturbing the low-resolution reference image portion with a noise to obtain a noise-perturbed version of the low-resolution reference image portion. By having the noise-perturbed version of the low-resolution reference image portions, the number of training samples may be increased. For example, for each high-resolution reference image portion, multiple low-resolution reference image portions may be generated for training the deep neural network. Further, the deep neural network trained using the noise-perturbed version of the low-resolution reference image portions has much enhanced robustness. A deep neural network trained using the noise-perturbed version of the low-resolution reference image portions is far more efficient in processing low-resolution image portions having defects such as artifacts, chromatic aberration, dust, etc.

Optionally, the step of perturbing the low-resolution reference image portion includes performing YUV space conversion on the low-resolution reference image portion to separate the luminance component Y from the chrominance components U and V to obtain the luminance component of the pixels of the low-resolution reference image portion; and adding noise to the luminance component. Optionally, the noise is a random noise. Optionally, the noise is an evenly distributed random noise.

Optionally, the step of processing the input signal using a loss function is performed with a mean squared error algorithm.

In some embodiments, the step of performing the image composition process to compose the detail-enhanced image portion and the facial image to obtain the enhanced facial image includes integrating the detail-enhanced image portion into the facial image; and smoothing filtering a transitional region including an interface between the detail-enhanced image portion and the facial image outside the detail-enhanced image portion using the facial image as a guiding mask, thereby obtaining the enhanced facial image. Optionally, the step includes replacing a portion of the facial image corresponding to the image portion with the detail-enhanced image portion to obtain an integrated facial image including the detail-enhanced image portion and a portion outside the detail-enhanced image portion integrated together; and smoothing filtering a transitional region including an interface between the detail-enhanced image portion and the portion outside the detail-enhanced image portion using the facial image as a guiding mask, thereby obtaining the enhanced facial image.

In the present method, an enhanced facial image is obtained by first identifying and extracting an image portion defining a facial feature from the facial image, obtaining a detail-enhanced image portion by performing a detail enhancement process on the image portion, and composing the detail-enhanced image portion with the facial image. By generating the detail-enhanced image portion corresponding to the facial feature and integrating it into the facial image, the overall quality of the facial image can be greatly improved to achieve a recognizable facial image.

Figure 2:
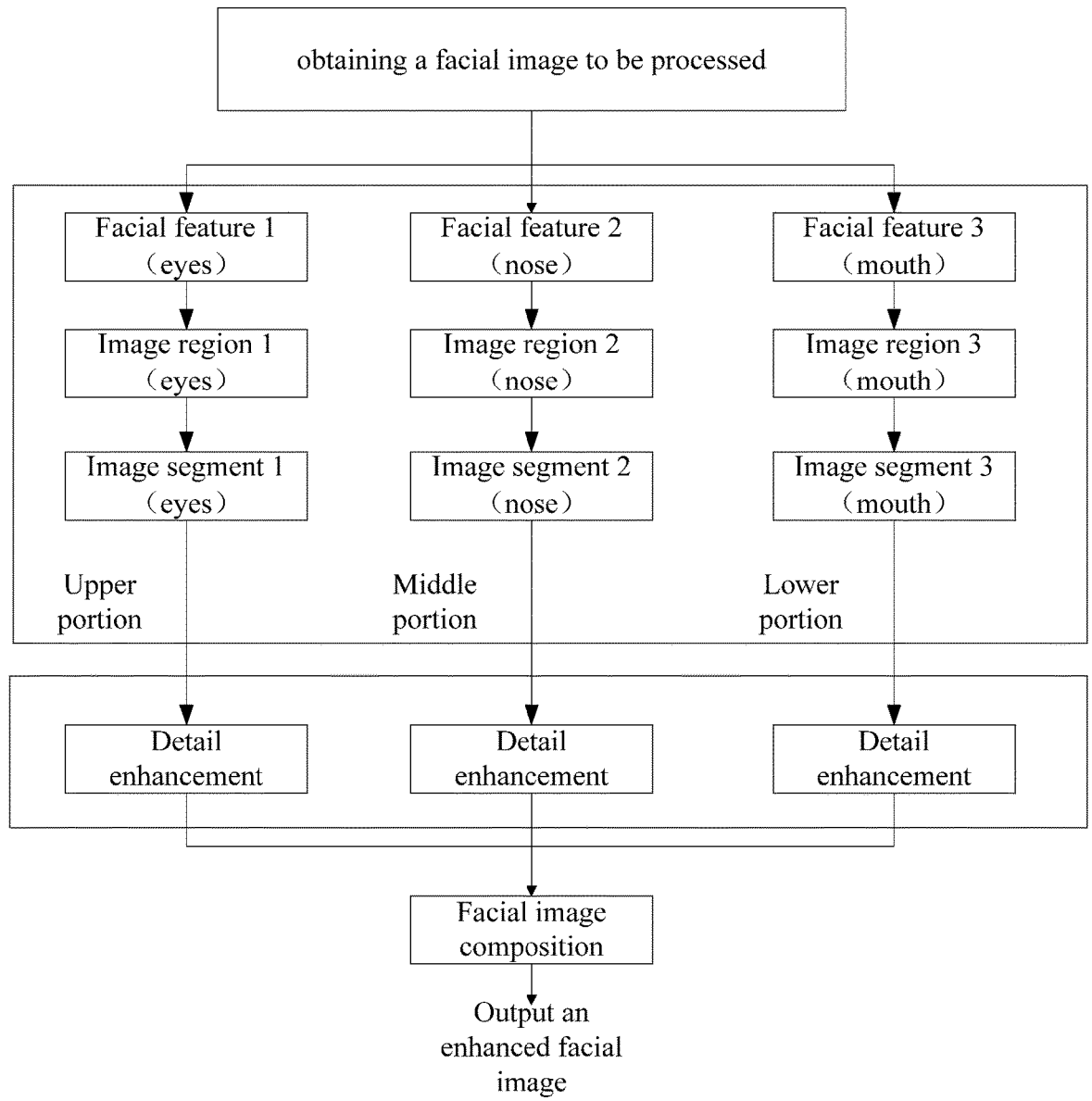
FIG. 2 is a flow chart illustrating a facial image processing method in some embodiments according to the present disclosure.

FIG. 2 is a flow chart illustrating a facial image processing method in some embodiments according to the present disclosure. Referring to FIG. 2, the facial image recognition is achieved using machine learning based on a sophisticated deep neural network model trained on a large amount of facial image data. Using the trained deep neural network, a facial image input is processed to obtain a detail-enhanced image portion corresponding a facial feature, the detail-enhanced image portion is integrated with the facial image to obtain an enhanced facial image. The enhanced facial image contains image portions corresponding to facial features with significantly enhanced details. Thus, the enhanced facial image has a much higher resolution as compared to an unprocessed facial image.

Referring to FIG. 2, the facial image processing method in some embodiments includes obtaining a facial image to be processed. The facial image may be captured by a camera, or a video recorder, or any appropriate image capturing device such as a smart phone. In some embodiment, the method further includes automatically identifying and extracting a plurality of image portions respectively defining a plurality of facial features in the facial image. As shown in FIG. 2, the facial features in some embodiments are a plurality of primary facial features such as the eyes, the nose, and the mouth. In some embodiments, the method includes processing the facial image using a convolutional neural network (e.g., a deep convolutional neural network) to determine a plurality of image regions in the facial image containing the plurality of primary facial features. For example, the plurality of primary facial features may include a facial feature 1 (eyes), a facial feature 2 (nose), and a facial feature 3 (mouth). Specifically, three image regions, image region 1 (corresponding to an upper portion of the facial image), image region 2 (corresponding to a middle portion of the facial image), and image region 3 (corresponding to a lower portion of the facial image), are determined, each of which contains a facial feature. For example, the image region 1 contains the facial feature 1, the image region 2 contains the facial feature 2, and the image region 3 contains the facial feature 3.

Figure 3:
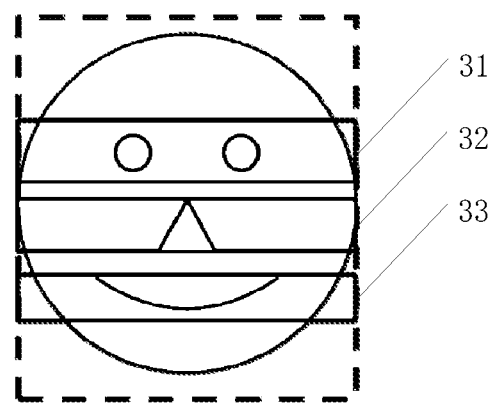
FIG. 3 illustrates a plurality of image regions in the facial image respectively containing a plurality of facial features m some embodiments according to the present disclosure.

FIG. 3 illustrates a plurality of image regions in the facial image respectively containing a plurality of facial features in some embodiments according to the present disclosure. Referring to FIG. 3, a rectangular sampling window can be used to slide over the facial image, e.g., from the middle portion downwards. The image in the rectangular sampling window may be used as an input for continuously inputting into the deep convolutional neural network. When the output from the deep convolutional neural network is 1, a mouth image region 33 (e.g., corresponding to the image region 3 in FIG. 2) is detected. When the output from the deep convolutional neural network is 0, the mouth image region 33 is not detected. A nose image region 32 (e.g., corresponding to the image region 2 in FIG. 2) and an eyes image region 31 (e.g., corresponding to the image region 1 in FIG. 2) ears be detected in a similar fashion.

In some embodiments, the method, further includes segmenting each of the plurality of image regions in the facial image to determine a plurality of image segments, each of which is in one of the plurality of image regions and contains one of the plurality of facial features, thereby obtaining a plurality of image segments corresponding to the plurality of facial features. Referring to FIG. 2, the plurality of image segments may include an image segment 1 in the image region 1 and containing the facial feature 1, an image segment 2 in the image region 2 and containing the facial feature 2, and an image segment 3 in the image region 3 and containing the facial feature 3. By having a segmenting step, the facial feature can be located more accurately. Optionally, the step of segmenting the image region is performed using a shallow neural network. Optionally, the step of segmenting the image region is performed using a deep neural network.

Figure 4:
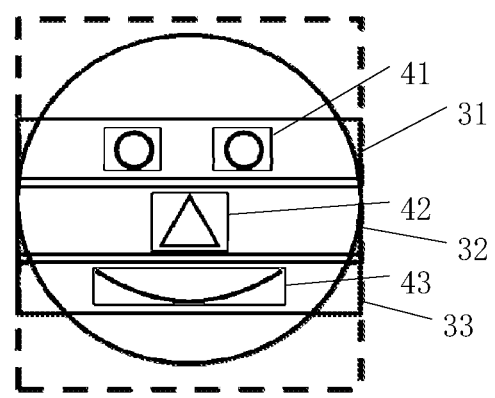
FIG. 4 illustrates a plurality of image segments in a plurality of image segments respectively containing a plurality of facial features in some embodiments according to the present disclosure.

FIG. 4 illustrates a plurality of image segments in a plurality of image segments respectively containing a plurality of facial features in some embodiments according to the present disclosure. Referring to FIG. 4, each of the eyes image region 31, the nose image region 32, and the mouth image region 33 is segmented to determine a plurality of images segments corresponding to the plurality of facial features. For example, an eyes image segment 41 corresponding to eyes in the eyes image region 31 can be determined, a nose image segment 42 corresponding to nose in the nose image region 32 can be determined, and a mouth image segment 43 corresponding to mouth in the mouth image region 33 can be determined.

For example, a rectangular sampling window can be used to slide over the mouth image region 33 to determine a mouth image segment 43. Optionally, the rectangular sampling window for segmenting has a size smaller than that of the rectangular sampling window for determining the mouth image region 33. The image in the rectangular sampling window may be used as an input for continuously inputting into the deep convolutional neural network. When the output from the deep convolutional neural network is 1, a mouth image segment 43 (e.g., corresponding to the image segment 3 in FIG. 2) is detected. When the output from the deep convolutional neural network is 0, the month image segment 43 is not detected. A nose image segment 42 (e.g., corresponding to the image segment 2 in FIG. 2) and an eyes image segment 41 (e.g., corresponding to the image segment 1 in FIG. 2) can be detected in a similar fashion.

Figure 5:
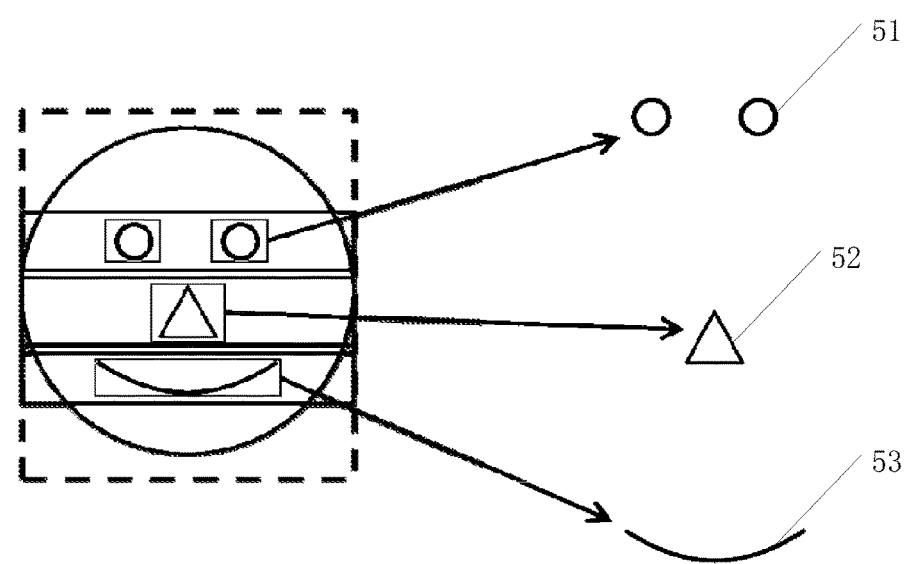
FIG. 5 illustrates a plurality of image portions defining a plurality of facial features in some embodiments according to the present disclosure.

In some embodiments, the method further includes labeling a plurality of pixels (e.g., each pixel) in the plurality of image segments thereby extracting the plurality of image portions respectively defining the plurality of facial features. Optionally, the plurality of pixels (e.g., each pixel) are labeled using an image segmentation algorithm. Optionally, the image segmentation algorithm is a GraphCut image segmentation algorithm. Optionally, the image segmentation algorithm is a gbtree image segmentation algorithm. FIG. 5 illustrates a plurality of image portions defining a plurality of facial features in some embodiments according to the present disclosure. Referring to FIG. 5, the plurality of image portions in some embodiments includes an eyes image-portion 51 defining an eyes facial feature, a nose image portion 52 defining a nose facial feature, and a mouth image portion 53 defining a mouth facial feature.

Referring to FIG. 2, subsequent to automatically identifying and extracting the plurality of image portions defining the plurality of facial features, the method in some embodiments further includes performing a detail enhancement process on the plurality of image portions to obtain a plurality of detail-enhanced image portions corresponding to the plurality of image portions. Specifically, the step includes inputting an input signal including an image portion or derived from the image portion as an input into an input layer of the deep neural network that has been trained, to obtain a detail-enhanced image portion.

First, the step includes providing a deep neural network having an input layer, a plurality of hidden layers, and an output, layer; and inputting the input signal including the image portion or derived from the image portion as the input into the input layer of the deep neural network. The input signal is then processed by the plurality of hidden layers of the deep neural network to obtain a processed signal, and the processed signal is transmitted to the output layer and outputted from the output layer as the detail-enhanced image portion. Each of the plurality of image portions may be processed by the deep neural network to obtain a detail-enhanced image portion. For example, the eyes image portion, the nose image portion, and the mouth image portion may be processed by the deep neural network to obtain a detail-enhanced eyes image portion, a detail-enhanced nose image portion, and a detail-enhanced month image portion.

In some embodiments, the deep neural network is trained using a plurality of pairs of high-resolution image portion and low-resolution image portion. Optionally, the plurality of pairs of high-resolution image portion and low-resolution image portion are generated by providing a plurality of high-resolution reference image portions; and generating a plurality of low-resolution reference image portions respectively corresponding to the plurality of high-resolution reference image portions. Optionally, generating a plurality of low-resolution reference image portions includes generating a noise-perturbed version of a low-resolution reference image portion corresponding to one of the plurality of high-resolution reference image portions. Optionally, generating a noise-perturbed version of the low-resolution reference image portion includes perturbing the low-resolution reference image portion with a noise to obtain a noise-perturbed version of the low-resolution reference image portion. The purpose of using the noise-perturbed version of the low-resolution reference image portion is to enhance the robustness of the network and avoid a situation in which the detail-enhanced image portion being a mere duplicate of the image portion inputted into the deep neural network.

In order to enable the image portion more conductive to the restoration and reconstruction of details of various facial features, and to use one network for enhancing details of image portions corresponding to various different types of facial features, a monitoring signal may be added in the hidden layers of the deep convolutional neural network. Optionally, the step of processing the input signal through the one or more hidden layers of the deep neural network includes processing the input signal using a loss function. A signal processed by the loss function is outputted from the output layer as the detail-enhanced image portion.

Referring to FIG. 2, the method in some embodiments further includes performing an image composition process to compose the detail-enhanced image portion and the facial image together to obtain an enhanced facial image. As discussed above, the unprocessed facial image has a low resolution, and many details of the facial feature is missing and unclear. Optionally, the step includes first integrating the detail-enhanced image portion into the facial image. Specifically, the step includes replacing a portion of the facial image corresponding to the image portion with the detail-enhanced image portion to obtain an integrated facial image including the detail-enhanced image portion and a portion outside the detail-enhanced image portion integrated together. After the detail-enhanced image portion is integrated into the facial image, the transitional regions between the detail-enhanced image portion and the facial image outside the detail-enhanced image portion (e.g., the facial image portion abutting the detail-enhanced image portion) may not be smooth, and the image may appear unnatural in the transitional regions. Accordingly, the method in some embodiments further includes smoothing filtering the transitional regions between the detail-enhanced image portion and the facial image outside the detail-enhanced image portion using the facial image as a guiding mask, thereby obtaining the enhanced facial image.

In the present method, an enhanced facial image is obtained by first identifying and extracting an image portion defining a facial feature from the facial image, obtaining a detail-enhanced image portion by performing a detail enhancement process on the image portion, and composing the detail-enhanced image portion with the facial image. By generating the detail-enhanced image portion corresponding to the facial feature and integrating it into the facial image, the overall quality of the facial image can be greatly improved to achieve a recognizable facial image.

Figure 6:
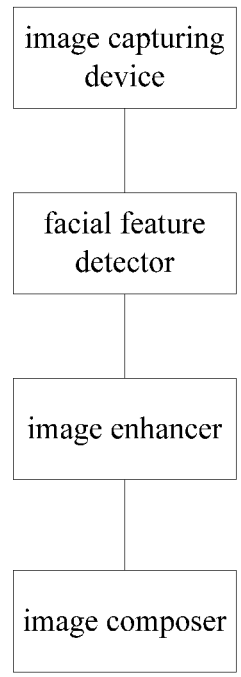
FIG. 6 is a schematic diagram illustrating the structure of a facial image processing apparatus in some embodiments according to the present disclosure.

FIG. 6 is a schematic diagram illustrating the structure of a facial image processing apparatus in some embodiments according to the present disclosure. Referring to FIG. 6, the facial image processing apparatus in some embodiments includes an image capturing device 41, a facial feature detector 42, an image enhancer 43, and an image composer 44. The image capturing device 41 may be a camera, or a video recorder, or any appropriate image capturing device. Optionally, the image capturing device 41 or a component thereof stores or converts an image in a digital form and the facial image processing apparatus in some embodiments further includes a memory for storing the digital data that defines the image.

In some embodiments, the facial feature detector 42 is configured to automatically identify and extract an image portion defining a facial feature from a facial image. Optionally, the facial feature detector 42 is configured to analyze the digital data stored in the memory and automatically identify and extract an image portion defining a facial feature from a facial image. Optionally, the facial feature detector 42 includes an image region divider, an image region segmentator, and a pixel labeler. The image region divider is configured to process the facial image using a convolutional neural network (e.g., a deep convolutional neural network) to determine an image region in the facial image containing the facial feature. The image region segmentator is configured to segment the image region in the facial image to determine an image segment in the image region and containing the facial feature, thereby obtaining an image segment corresponding to the facial feature. The pixel labeler is configured to label a plurality of pixels (e.g., each pixel) in the image segment thereby extracting the image portion. Optionally, the image region is segmented using a shallow neural network.

In some embodiments, the image enhancer 43 is configured to perform a detail enhancement process on the image portion to obtain a detail-enhanced image portion corresponding to the image portion. Optionally, the image enhancer 43 is configured to provide a deep neural network, the deep neural network that has been trained; input an input signal including the image portion or derived from the image portion as an input into an input layer of the deep neural network; process the input signal through one or more hidden layers of the deep neural network to obtain a processed signal; and output the processed signal from an output layer of the deep neural network as the detail-enhanced image portion.

In some embodiments, the deep neural network is trained using a plurality of pairs of high-resolution image portion and low-resolution image portion. Optionally, the plurality of pairs of high-resolution image portion and low-resolution image portion are generated by providing a plurality of high-resolution reference image portions; and generating a plurality of low-resolution reference image portions respectively corresponding to the plurality of high-resolution reference image portions. Optionally, generating a plurality of low-resolution reference image portions includes generating a noise-perturbed version of a low-resolution reference image portion corresponding to one of the plurality of high-resolution reference image portions. Optionally, generating a noise-perturbed version of the low-resolution reference image portion includes perturbing the low-resolution reference image portion with a noise to obtain a noise-perturbed version of the low-resolution reference image portion. The purpose of using the noise-perturbed version of the low-resolution reference image portion is to enhance the robustness of the network and avoid a situation in which the detail-enhanced image portion, being a mere duplicate of the image portion inputted into the deep neural network.

Optionally, a monitoring signal may be added in the hidden layers of the deep convolutional neural network. Optionally, the image enhancer 43 is configured to process the input signal through the one or more hidden layers of the deep neural network, including processing the input signal using a loss function. A signal processed by the loss function is outputted from the output layer as the detail-enhanced image portion. The purpose of implementing a loss function in the one or more hidden layers of the deep neural network is to enable the image portion more conducive to the restoration and reconstruction of details of various facial features, and to use one network for enhancing details of image portions corresponding to various different types of facial features.

In some embodiments, the image composer 44 is configured to perform an image composition process to compose the detail-enhanced image portion and the facial image to obtain an enhanced facial image. Optionally, the image composer 44 includes an image integrator and a smoothing filter. The image integrator is configured to replace a portion of the facial image corresponding to the image portion with the detail-enhanced image portion to obtain an integrated facial image including the detail-enhanced image portion and a portion outside the detail-enhanced image portion integrated together. The smoothing filter is configured to smoothing filter a transitional region including an interface between the detail-enhanced image portion and the portion outside the detail-enhanced image portion using the facial image as a guiding mask, thereby obtaining the enhanced facial image.

Using the present apparatus, an enhanced facial image is obtained by first identifying and extracting an image portion defining a facial feature from the facial image, obtaining a detail-enhanced image portion by performing a detail enhancement process on the image portion, and composing the detail-enhanced image portion with the facial image. By generating the detail-enhanced image portion corresponding to the facial feature and integrating it into the facial image, the overall quality of the facial image can be greatly improved to achieve a recognizable facial image.

Figure 7:
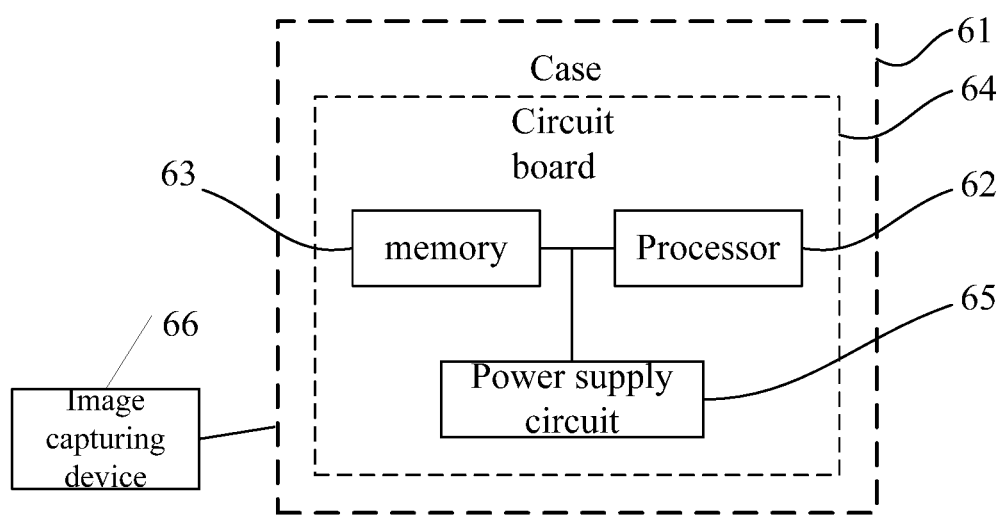
FIG. 7 is a schematic diagram illustrating the structure of a facial image processing apparatus for processing a facial image in some embodiments according to the present disclosure.

FIG. 7 is a schematic diagram illustrating the structure of a facial image processing apparatus for processing a facial image m some embodiments according to the present disclosure. Referring to FIG. 7, the facial image processing apparatus in some embodiments includes a case 61, a processor 62, a memory 63, a circuit board 64, and a power supply circuit 65. The circuit board 64 is disposed in a space surrounded by the case 61. The memory 63 and the processor 62 are disposed on the circuit board 64. The power supply circuit 65 supplies power to various components of the facial image processing apparatus. The memory 63 and the processor 62 are communicatively connected with each other. In some embodiments, the memory 63 stores computer-executable instructions for controlling the processor 62 to automatically identify and extract an image portion defining a facial feature from a facial image; perform a detail enhancement process on the image portion to obtain a detail-enhanced image portion corresponding to the image portion; and perform image composite processing to compose the detail-enhanced image portion and the facial image to obtain an enhanced facial image.

Optionally, when the processor controlled by the computer-executable instructions to automatically identify and extract the image portion defining the facial feature from the facial image, it is controlled to process the facial image using a convolutional neural network (e.g., a deep convolutional neural network) to determine an image region in the facial image containing the facial feature; segment the image region in the facial image to determine an image segment in the image region and containing the facial feature, thereby obtaining an image segment corresponding to the facial feature; and label a plurality of pixels (e.g., each pixel) is the image segment thereby extracting the image portion. Optionally the image region is segmented using a shallow neural network.

Optionally, when the processor 62 is controlled by the computer-executable instructions to perform the detail enhancement process on the image portion to obtain the detail-enhanced image portion corresponding to the image portion, it is controlled to provide a deep neural network, the deep neural network that has been trained; input an input signal including the image portion or derived from the image portion as an input into an input layer of the deep neural network; process the input signal through one or more hidden layers of the deep neural network to obtain a processed signal; and output the processed signal from an output layer of the deep neural network as the detail-enhanced image portion.

Optionally, when the processor 62 is controlled by the computer-executable instructions to perform the detail enhancement process on the image portion to obtain the detail-enhanced image portion corresponding to the image portion.

Optionally, when the processor 62 is controlled by the computer-executable instructions to process the input signal through the one or more hidden layers of the deep neural network to obtain the processed signal, it is controlled to process the input signal using a loss function.

Optionally, when the processor 62 is controlled by the computer-executable instructions to perform image composite processing to compose the detail-enhanced image portion and the facial image to obtain the enhanced facial image, it is controlled to replace a portion of the facial image corresponding to the image portion with the detail-enhanced image portion to obtain an integrated facial image including the detail-enhanced image portion and a portion outside the detail-enhanced image portion integrated together; and smoothing filter a transitional region including an interface between the detail-enhanced image portion and the portion outside the detail-enhanced image portion using the facial image as a guiding mask, thereby obtaining the enhanced facial image.

In some embodiments, the facial image includes a plurality of facial features. In some embodiments, the memory 63 stores computer-executable instructions for controlling the processor 62 to automatically identify and extract from a facial image a plurality of image portions respectively defining a plurality of facial features; perform a detail enhancement process on the plurality of image portions to obtain a plurality of detail-enhanced image portions respectively corresponding to the plurality of image portions; and perform image composite processing to compose the plurality of detail-enhanced image portions and the facial image to obtain the enhanced facial image.

Referring to FIG. 7, in some embodiments, the facial image processing apparatus further includes an image capturing device 66 (e.g., a camera) configured to obtain a facial image to be processed. The image capturing device 66 is communicatively connected with the processor 62.

Using the present apparatus, an enhanced facial image is obtained by first identifying and extracting an image portion defining a facial feature from the facial image, obtaining a detail-enhanced image portion by performing a detail enhancement process on the image portion, and composing the detail-enhanced image portion with the facial image. By generating the detail-enhanced image portion corresponding to the facial feature and integrating it into the facial image, the overall quality of the facial image can be greatly improved to achieve a recognizable facial image.

In another aspect, the present disclosure further provides a non-transitory computer-readable storage medium storing computer-readable instructions. In some embodiments, the computer-readable instructions are executable by a processor to cause the processor to perform automatically identifying and extracting an image portion defining a facial feature from a facial image; performing a detail enhancement process on the image portion to obtain a detail-enhanced image portion corresponding to the image portion; and performing image composite processing to compose the detail-enhanced image portion and the facial image to obtain an enhanced facial image.

Optionally, automatically identifying and extracting the image portion includes processing the facial image using a convolutional neural network (e.g., a deep convolutional neural network) to determine an image region in the facial image containing the facial feature; segmenting the image region in the facial image to determine an image segment in the image region and containing the facial feature, thereby obtaining an image segment corresponding to the facial feature; and labeling a plurality of pixels (e.g., each pixel) in the image segment thereby extracting the image portion. Optionally, the image region is segmented using a shallow neural network.

Optionally, performing the detail enhancement process on the image portion includes providing a deep neural network, the deep neural network that has been trained; inputting an input signal including the image portion or derived from the image portion as an input into an input layer of the deep neural network; processing the input signal through one or more hidden layers of the deep neural network to obtain a processed signal; and outputting the processed signal from an output layer of the deep neural network as the detail-enhanced image portion.

Optionally, the deep neural network is trained using a plurality of pairs of high-resolution image portion and low-resolution image portion. The plurality of pairs of high-resolution image portion and low-resolution image portion are generated by providing a plurality of high-resolution reference image portions; and generating a plurality of low-resolution reference image portions respectively corresponding to the plurality of high-resolution reference image portions. Optionally, generating a plurality of low-resolution reference image portions includes generating a noise-perturbed version of a low-resolution reference image portion corresponding to one of the plurality of high-resolution reference image portions. Optionally, generating a noise-perturbed version of the low-resolution reference image portion includes perturbing the low-resolution reference image portion with a noise to obtain a noise-perturbed version of the low-resolution reference image portion.

Optionally, processing the input signal through the one or more hidden layers of the deep neural network includes processing the input signal using a loss function.

Optionally, performing image composite processing to compose the detail-enhanced image portion and the facial image to obtain the enhanced facial image includes replacing a portion of the facial image corresponding to the image portion with the detail-enhanced image portion to obtain an integrated facial image including the detail-enhanced image portion and a portion outside the detail-enhanced image portion integrated together; and smoothing filtering a transitional region including an interface between the detail-enhanced image portion and the portion outside the detail-enhanced image portion using the facial image as a guiding mask, thereby obtaining the enhanced facial image.

The foregoing description of the embodiments of the invention has been presented for purposes of illustration and description. It is not intended to be exhaustive or to limit the invention to the precise form or to exemplary embodiments disclosed. Accordingly, the foregoing description should be regarded as illustrative rather than restrictive. Obviously, many modifications and variations will be apparent to practitioners skilled in this art. The embodiments are chose and described in order to explain the principles of the invention and its best mode practical application, thereby to enable persons skilled in the art to understand the invention for various embodiments and with various modifications as are suited to the particular use or implementation contemplated. It is intended that the scope of the invention be defined by the claims appended hereto and their equivalents in winch all terms are meant in their broadest reasonable sense unless otherwise indicated. Therefore, the term "the invention", "the present invention" or the like does not necessarily limit the claim scope to a specific embodiment, and the reference to exemplary embodiments of the invention does not imply a limitation on the invention, and no such limitation is to be inferred. The invention is limited only by the spirit and scope of the appended claims. Moreover, these claims may refer to use "first", "second", etc. following with noun or element. Such terms should be understood as a nomenclature and should not be construed as giving the limitation on the number of the elements modified by such nomenclature unless specific number has been given. Any advantages and benefits described may not apply to all embodiments of the invention. It should be appreciated that variations may be made in the embodiments described by persons skilled in the art without departing from the scope of the present invention as defined by the following claims. Moreover, no element and component in the present disclosure is intended to be dedicated to the public regardless of whether the element or component is explicitly recited in the following claims.

What is claimed is:

1. A facial image processing apparatus, comprising:
   a memory; and
   one or more processor;
   wherein the memory and the at least one processor are communicatively connected with each other;
   the memory stores computer-executable instructions for controlling the one or more processors to:
   automatically identify a facial feature from a facial image;
   automatically extract an image portion defining the facial feature from the facial image;
   perform a detail enhancement process on the image portion to obtain a detail-enhanced image portion corresponding to the image portion; and
   perform an image composition process to compose the detail-enhanced image portion and the facial image to obtain an enhanced facial image;
   wherein perform the image composition process comprises replace a portion of the facial image corresponding to the image portion with the detail-enhanced image portion to obtain an integrated facial image comprising the detail-enhanced image portion and a portion outside the detail-enhanced image portion integrated together; and
   integrate the detail-enhanced image portion and the portion outside the detail-enhanced image portion, thereby obtaining the enhanced facial image;
   wherein perform the detail enhancement process on the image portion to obtain the detail-enhanced image portion corresponding to the image portion comprises:
   provide a deep neural network, the deep neural network being trained using facial image training data;
   input an input signal comprising the image portion or derived from the image portion into an input layer of the deep neural network;
   process the input signal through one or more hidden layers of the deep neural network to obtain a processed signal; and
   output the processed signal from an output layer of the deep neural network as the detail-enhanced image portion;
   wherein the deep neural network is trained using a plurality of pairs of high-resolution image portion and low-resolution image portion;
   wherein the plurality of pairs of high-resolution image portion and low-resolution image portion are generated by:
   providing a plurality of high-resolution reference image portions as an input; and
   based on the plurality of high-resolution reference image portions, generating a plurality of low-resolution reference image portions respectively corresponding to the plurality of high-resolution reference image portions.

2. The facial image processing apparatus of claim 1, wherein the detail enhancement process is performed using a deep convolutional neural network trained on facial image training data.

3. The facial image processing apparatus of claim 1, wherein automatically extract the image portion defining the facial feature from the facial image comprises:
   process the facial image using a convolutional neural network to determine an image region in the facial image containing the facial feature;
   segment the image region in the facial image to determine an image segment in the image region containing the facial feature, thereby obtaining an image segment corresponding to the facial feature; and
   label a plurality of pixels in the image segment thereby extracting the image portion.

4. The facial image processing apparatus of claim 1, wherein generating a plurality of low-resolution reference image portions comprises generating a noise-perturbed version of a low-resolution reference image portion corresponding to one of the plurality of high-resolution reference image portions;
   generating a noise-perturbed version of the low-resolution reference image portion comprises adding noise to a luminance component of the low-resolution reference image.

5. The facial image processing apparatus of claim 1, wherein process the input signal through the one or more hidden layers of the deep neural network to obtain the processed signal comprises process the input signal using a loss function.

6. The facial image processing apparatus of claim 1, wherein integrate the detail-enhanced image portion and the portion outside the detail-enhanced image portion comprises:
   smoothing filter a transitional region comprising an interface between the detail-enhanced image portion and the portion outside the detail-enhanced image portion using the facial image as a guiding mask.

7. The facial image processing apparatus of claim 1, further comprises an image capturing device configured to capture the facial image, the image capturing device being communicatively connected with the processor.

8. The facial image processing apparatus of claim 1, wherein the facial image comprises a plurality of facial features;
   the memory stores computer-executable instructions for controlling the one or more processors to:
   automatically identify a plurality of facial features from a facial image;
   automatically extract a plurality of image portions respectively defining the plurality of facial features from the facial image;
   perform a detail enhancement process on the plurality of image portions to obtain a plurality of detail-enhanced image portions respectively corresponding to the plurality of image portions; and
   perform an image composition process to compose the plurality of detail-enhanced image portions and the facial image to obtain the enhanced facial image.

9. A facial image processing method, comprising:
- automatically identifying a facial feature from a facial image;
- automatically extracting an image portion defining the facial feature from the facial image;
- performing a detail enhancement process on the image portion to obtain a detail-enhanced image portion corresponding to the image portion; and
- performing an image composition process to compose the detail-enhanced image portion and the facial image to obtain an enhanced facial image;
- wherein performing the detail enhancement process comprises replacing a portion of the facial image corresponding to the image portion with the detail-enhanced image portion to obtain an integrated facial image comprising the detail-enhanced image portion and a portion outside the detail-enhanced image portion integrated together; and; and
- integrating the detail-enhanced image portion and the portion outside the detail-enhanced image portion, thereby obtaining the enhanced facial image;
- wherein performing the detail enhancement process on the image portion comprises:
- providing a deep neural network, the deep neural network being trained using facial image training data;
- inputting an input signal comprising the image portion or derived from the image portion into an input layer of the deep neural network;
- processing the input signal through one or more hidden layers of the deep neural network to obtain a processed signal; and
- outputting the processed signal from an output layer of the deep neural network as the detail-enhanced image portion;
- the method further comprises training the deep neural network using facial image training data;
- wherein training the deep neural network comprises:
- providing a plurality of high-resolution reference image portions as an input;
- based on the plurality of high-resolution reference image portions, generating a plurality of low-resolution reference image portions respectively corresponding to the plurality of high-resolution reference image portions, thereby obtaining a plurality of pairs of high-resolution image portion and low-resolution image portion; and
- training the deep neural network using the plurality of pairs of high-resolution image portion and low-resolution image portion.

10. The facial image processing method of claim 9, wherein performing the detail enhancement process comprises performing the detail enhancement process using a deep convolutional neural network trained on facial image training data.

11. The facial image processing method of claim 9, wherein automatically extracting the image portion comprises:
- processing the facial image using a convolutional neural network to determine an image region in the facial image containing the facial feature;
- segmenting the image region in the facial image to determine an image segment in the image region and containing the facial feature, thereby obtaining an image segment corresponding to the facial feature; and
- labeling a plurality of pixels in the image segment thereby extracting the image portion.

12. The facial image processing method of claim 9, wherein generating a plurality of low-resolution reference image portions comprises generating a noise-perturbed version of a low-resolution reference image portion corresponding to one of the plurality of high-resolution reference image portions;
- generating a noise-perturbed version of the low-resolution reference image portion comprises adding noise to a luminance component of the low-resolution reference image.

13. The facial image processing method of claim 9, wherein processing the input signal through the one or more hidden layers of the deep neural network comprises processing the input signal using a loss function.

14. The facial image processing method of claim 9, wherein integrating the detail-enhanced image portion and the portion outside the detail-enhanced image portion comprises:
- smoothing filtering a transitional region comprising an interface between the detail-enhanced image portion and the portion outside the detail-enhanced image portion using the facial image as a guiding mask.

15. A non-transitory computer-readable storage medium storing computer-readable instructions, the computer-readable instructions being executable by a processor to cause the processor to perform:
- automatically identifying a facial feature from a facial image;
- automatically extracting an image portion defining the facial feature from the facial image;
- performing a detail enhancement process on the image portion to obtain a detail-enhanced image portion corresponding to the image portion; and
- performing an image composition process to compose the detail-enhanced image portion and the facial image to obtain an enhanced facial image;
- wherein performing the detail enhancement process comprises replacing a portion of the facial image corresponding to the image portion with the detail-enhanced image portion to obtain an integrated facial image comprising the detail-enhanced image portion and a portion outside the detail-enhanced image portion integrated together; and; and
- integrating the detail-enhanced image portion and the portion outside the detail-enhanced image portion, thereby obtaining the enhanced facial image;
- wherein performing the detail enhancement process on the image portion comprises:
- providing a deep neural network, the deep neural network being trained using facial image training data;
- inputting an input signal comprising the image portion or derived from the image portion into an input layer of the deep neural network;
- processing the input signal through one or more hidden layers of the deep neural network to obtain a processed signal; and
- outputting the processed signal from an output layer of the deep neural network as the detail-enhanced image portion;
- wherein the deep neural network is trained by:
- providing a plurality of high-resolution reference image portions as an input;
- based on the plurality of high-resolution reference image portions, generating a plurality of low-resolution reference image portions respectively corresponding to the plurality of high-resolution reference image portions, thereby obtaining a plurality of pairs of high-resolution image portion and low-resolution image portion; and training the deep neural network using the plurality of pairs of high-resolution image portion and low-resolution image portion.

16. The non-transitory computer-readable storage medium of claim 15, wherein the detail enhancement process is performed using a deep convolutional neural network trained on facial image training data.

* * * * *